Oct. 19, 1965  J. P. McMAHON  3,212,948
METHOD OF FORMING A SHAPED PRODUCT
Filed Nov. 15, 1962
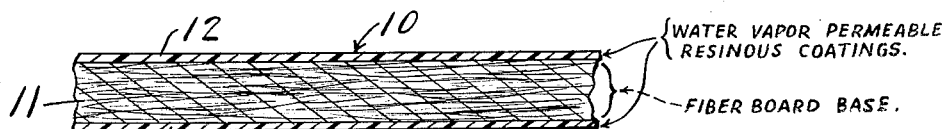
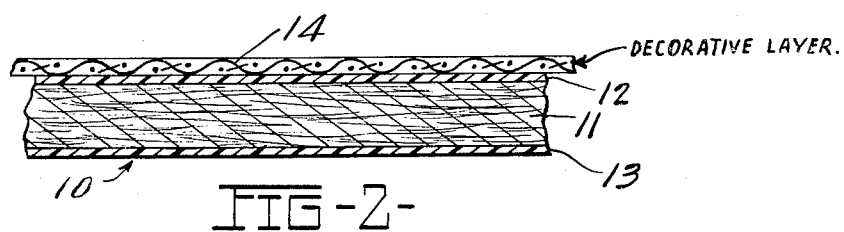
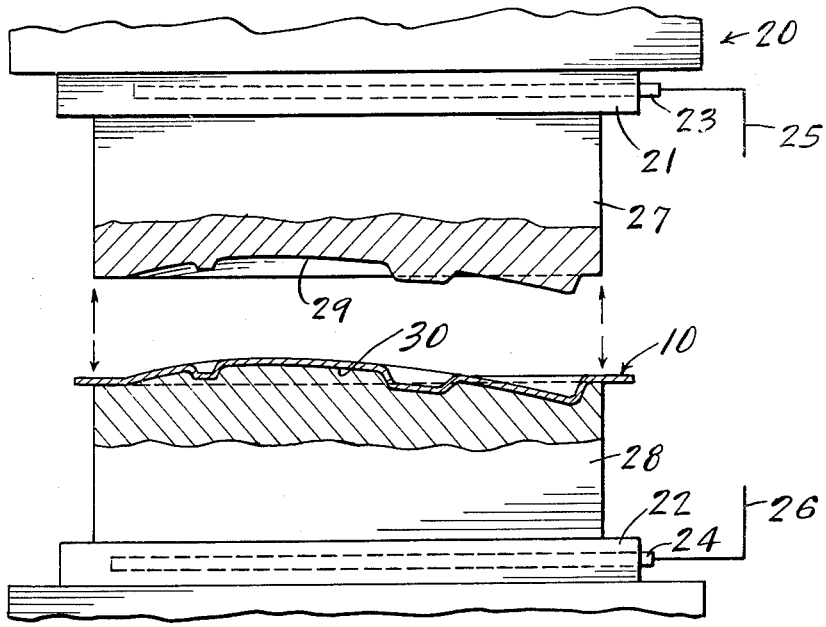
INVENTOR:
JOHN P. McMAHON.
BY
ATT'Y.

United States Patent Office 3,212,948
Patented Oct. 19, 1965

3,212,948
METHOD OF FORMING A SHAPED PRODUCT
John P. McMahon, Grosse Isle, Mich., assignor to Consolidated Packaging Corporation, a corporation of Michigan
Filed Nov. 15, 1962, Ser. No. 237,945
2 Claims. (Cl. 156—212)

This invention relates to a resinous forming board product having an elastic coating, and the method of producing said product. More particularly, it deals with a resin impregnated fiberboard having an elastomeric moisture vapor permeable coating on at least one side thereof which coating prevents the board from rupturing while it is being formed under heat and/or pressure in a press, as well as providing an adhesive coating to which a covering material or sheet may be applied, even simultaneously with the forming of the board product in the press.

Such a forming board product is used in the production of furniture including chair seats and the like, luggage and trunk liners, package trays, insulation, wall and door panels, heater housings, kick panels, sun visors, etc. for vehicles including busses, and the like, in which the product is formed into irregular shapes by a mold in a press from a preheated moist sheet of fiberboard impregnated with a resin and coated with a resinous coating of the type disclosed herein.

Accordingly it is an object of this invention to produce a resin containing fiberboard which does not rupture and forms perfectly when under heat and pressure in the mold of a forming press.

Another object is to produce such a board which has a coating that has good oil, grease, water, and abrasive resistance, but has a low resistance to the transmission of moisture vapor, that is it has low moisture vapor barrier properties so that the board may be steamed before forming to soften the fibers therein, and also may be dried during the forming operation without blistering the coating.

Another object is to produce such a forming board having a coating which also has adhesive properties to which a layer or covering material may be applied directly and simultaneously with the forming of the board in a press, which layer or covering material may include a fabric, a plastic, leather, or the like.

Generally speaking the resin forming board of this invention comprises a fiberboard sheet produced on a wet or dry paper making machine, which contains between about 25% and 40% by weight of a resinous material which flows under pressure and heat, and which is formed into the board as an aqueous dispersion in the aqueous suspension of the fibers applied to the machine, or else impregnated into the board by dipping, coating, or spraying with the resinous material before the board is dried. To this resin containing board there is coated, such as on a roll coater, a liquid solution, a hot melt, a suspension, or an emulsion of a resin which has a low resistance to the transmission of moisture vapor when dried as well as being extensible to follow the contours of the board as it is formed in a press, at least during its forming operation. This resinous coating preferably also has adhesive properties at the press forming temperature of the board to retain any decorative or covering sheet which may be applied to the board. Both sides of the board may be coated with this resinous coating, and a covering or finishing sheet may be applied to one or both sides thereof. However, if both sides are not so covered, the side which does not contain the cover material coating may be coated with a material to prevent the sheets from sticking together such as castor wax.

Thermoplastic or thermosetting resins may be employed in the base of the fiberboard sheet, such as hydrocarbon polymers, terpine resins, polyvinyl acetate, acrylics, polyethylenes, rubber latexes, or the like, provided they flow under the heat and/or pressure which is applied during the forming of the resulting board in a press.

The resinous moisture-vapor permeable coating which is applied to this board and prevents it from rupture during its formation, as well as acting as an adhesive for a covering or decorative sheet therefor, is applied usually in a thickness between about 1 and 5 mils by a roll coater from an aqueous suspension of the resin, which suspension may contain an emulsifier to maintain the solid resinous particles dispersed therein. The suspending liquid generally is water, however alcohol or another liquid may be used, or a hot melt technique employed, without departing from the scope of this invention.

In order to prevent rupture of the board during its forming operation the board is generally placed in a steam cabinet or the like, or impregnated with live steam to soften the cellulose fibers therein, so they can readily be molded. Therefore the coating must have a low moisture vapor resistance so that the steam may penetrate into the board from both sides thereof, whether or not the board is coated on both sides or not, and also may escape during or after the formation of the board in the press and prevent the formation of blisters in the coating. Furthermore the particular coating must have extensible properties or become of elastomeric nature when the coated board is subjected to the aforementioned conditions of pre-heating and forming in a press.

Some examples of the types of resinous polymers which may be employed for this coating include: polyvinyl acetate, polyacrylic acid esters, polystyrene-polybutadiene copolymers, and other natural or synthetic rubber latexes. Specifically butadiene-acrylonitrile rubber copolymers, butadiene-styrene rubber copolymers, butyl rubber homopolymers or polyisobutylene, and natural rubber homopolymers have been found to be elastomeric whether preheated with live steam or not; and it has been found that polyvinyl acetate homopolymers, polyvinyl acetate-polyvinyl chloride copolymers, polyvinyl acetate-polyacrylic acid ester copolymers, and polyacrylic acid ester homopolymers acquire the desirable elastomeric properties when pre-heated with live steam. Some of the other resins and latexes which have been found to be useful, include alkyd modified-urea-formaldehyde resins and mixtures of the aforementioned vinyl or acrylic latexes with rubber latexes.

On the other hand, some coatings which have been found to be unsatisfactory, include polyvinylidene and polyvinyl chloride homo- and co-polymers, high styrene type butadiene-styrene polymers, and high acrylonitrile type butadiene-acrylonitrile copolymers. However, polymers with less than 50% by weight of styrene or acrylonitrile do produce a satisfactory coating. In fact coatings which do not have desirable permeability and/or formability may be employed up to 50% by weight with coatings that do, and still produce a usable and effective coating for the coating of the forming board of this invention, such as for example, a 50–50% by weight mixture of butyl rubber and polyvinylidene chloride.

Also mixtures of moisture vapor permeable and formable coatings may be employed in different proportions as desired, such as for example butyl rubber with polyvinyl acetate in a 50–50% mixture also makes an excellent coating as well as does each of these products separately.

The covering sheet which may be applied to the coating on the forming board of this invention may be a woven or unwoven fabric or a plastic material, however, the material must have a softening point at least 20° F. and preferably 20° F. to 50° F. lower than its melting point, as well as being able to be stretched to follow the contours of the mold, if it is applied at the same time the board is molded into shape in a press. Some plastics in covering sheets which have such different softening and melting points and which can be stretched include most solution spun fibers as distinguished from melt spun fibers. Some examples of these usable plastics are: acrylonitrile type, vinyl types including polyvinyl chlorides and/or polyvinyl acetates, copolymers of acrylonitrile and polyvinyl chloride, and tripolymers of acrylonitrile, butadiene and styrene (ABS), which are now sold under trade names of "Orlon," "Acrilan," "Vinyon," "Dynel" and "Kralastic." Decorative sheets which contain "Dacron," "nylon" and "Saran" plastics, however, do not have softening points sufficiently low, and accordingly cannot be used as a cover coating for formation in a molding press of the board product of this invention.

The above mentioned and other features and objects of this invention and the manner of attaining them will become more apparent and the invention itself will be understood best by reference to the following description of specific embodiments of the invention taken in conjunction with the accompaying drawing, wherein:

FIG. 1 is an enlarged cross section of a resin forming board according to one embodiment of this invention showing a coating on each side thereof;

FIG. 2 is an enlarged cross section of the board shown in FIG. 1 together with a decorative layer integrally adhered to one side thereof; and FIG. 3 is a schematic vertical cross section of the molds and heated platens of a press, shown in its open position with a section of a door panel therein formed of a resin board similar to that shown in FIG. 1.

Referring to FIG. 1 there is shown one embodiment of the resin forming board 10 according to this invention comprising an intermediate base fiberboard sheet 11 on each side of which is integrally applied a water-vapor permeable resinous coating 12 and 13.

In FIG. 2 the forming board 10 of FIG. 1 is shown with a decorative or covering sheet 14 integrally adhered to one side thereof, which sheet may be applied at the same time the board is formed in a press.

A schematic view of a press 20 is shown in FIG. 3 having upper and lower electrically heated platens 21 and 22 containing electric heaters 23 and 24, respectively, connected by electric conductors 25 and 26. Attached to these platens are the upper and lower door mold parts 27 and 28 having conforming irregular mold surfaces 29 and 30, respectively, for forming the resin coated board 10 into the configuration of these surfaces without causing rupture thereof at the sharp irregularities in the surface.

Some specific examples of effective resin forming boards which have been molded in a press without rupture are described below:

A kraft type board of .080" thickness containing 25% of a polyterpine thermoplastic resin (namely "Piccolyte" manufactured by the Pennsylvania Industrial Chemical Co.) was prepared, and samples thereof were selected and coated with each of the following different aqueous solutions of polymers to form a 2 to 4 mils dry thickness coating or layer on one side of the board. Each of these samples, including an uncoated sample, were then preheated in a steam chest containing an atmosphere of live steam for about 1 to 2 minutes and then they immediately were placed into a 200 ton hydraulic press equipped with electrically heated platens and a two piece cast steel mold and formed under pressure into a door panel. The molding temperature was 180° F. and a pressure of 1,000 pounds per square inch was applied for 30 to 60 seconds. All of the samples which were coated did not rupture during the forming operation and were formed into perfect panels while the panels that were not coated ruptured.

Example I had a coating of 60/40 butadiene-acrylonitrile rubber.

Example II had a coating of butyl rubber or polyisobutylene.

Example III had a coating of 40/60 ratio butadiene styrene rubber.

Example IV had a coating of polyvinyl acetate.

Example V had a coating of 60/40 polyvinyl acetate-polyvinyl chloride resin copolymer.

Example VI had a coating of polyvinyl acetate-polyvinyl acrylic acid ester resin.

Example VII had a coating of polyacrylic acid ester resin.

Example VIII had a coating of a 50–50 mixture of polyisobutylene rubber and polyvinylidene chloride resin.

Example IX had a coating of a 50–50 mixture of polyisobutylene rubber and polyvinyl acetate resin.

Example X.—A 100 to 110 point (or .100 to .110 inch in thickness) kraft type fiberboard impregnated with 25% of polyterpine resin, namely Piccolyte (manufactured by the Pennsylvania Industrial Chemical Co.), was coated to a thickness between 3 to 5 mils of a polyvinyl acetate resin, namely Vinymul No. 75–2585 (manufactured by the Morning Star-Paisley Co.), and then coated on one side as shown in FIG. 2 with a decorative plastic layer of polyvinyl chloride and acrylonitrile resin, namely "Dynel" (manufactured by the Union Carbide & Chemical Corporation). The resulting board assembly was then heated to about 200° F. to flexibilize and soften the board and the coating, which may include steaming, or soaking in water and heating with infra-red heating elements. The resulting softened and heated assembly was then placed in a 200 ton capacity hydraulic press equipped with electrically heated platens, and a two-piece cast steel alloy attaché case mold having 12½ inch by 18½ inch inside dimension. A molding temperature of 180° F. and a pressure of one thousand pounds per square inch for 30 to 60 seconds was employed in forming the decoratively curved attaché case section, which did not show any rupture and formed perfectly in the mold with the decorative layer integrally adhered thereto without the formation of any blisters under the decorative layer or the permeable polyvinyl acetate resin coatings.

While there is described above the principles of this invention in connection with a specific product, it is to be clearly understood that this description is made only by way of example and not as a limitation to the scope of this invention.

What is claimed is:

1. A method of forming a resin impregnated and sheet covered and shaped product having relatively sharp irregularities in its surface, comprising:
    (A) wetting and heating a resin containing fiberboard to produce an atmosphere of moisture ladened steam around said fiberboard to impregnate said fiberboard with water to soften the fibers in said board, said fiberboard having:
        (1) a permeable resinous coating directly applied to at least one side of said fiberboard, said coating having:
            (a) a thickness of between about 1 and 5 mils.
            (b) an elastomeric nature to permit stretching around the sharp irregularities in the surface of the resulting product and to prevent rupture of said fiberboard,
            (c) a low resistance to the transmission of moisture vapor for release of the water in the fiberboard during the forming and shaping of the final product,
            (d) adhesive properties when subjected to heat and pressure for producing an integral final product, and
            (e) comprising a polymer of at least 50% by weight of at least one resin selected from the group consisting of: polyvinyl acetate, polystyrene, polybutadiene, butadiene acrylonitrile rubber latex, polyisobutylene rubber latex, and natural rubber latex; and having:
        (2) a permeable stretchable covering sheet adjacent said coating for forming around the irregularities in the surface of the final product without rupturing, and (B) thereafter applying both heat of about 180° F. and a pressure of about 1,000 pounds per square inch simultaneously to said water impregnated and coated fiberboard and said stretchable sheet in a heated shaped mold in a press for between about 30 and 60 seconds to produce an integral shaped molded product therefrom, whereby said coating under said heat and pressure of this step adheres said stretchable covering sheet to said shaped fiberboard and prevents rupture of said fiberboard, and whereby the moisture vapor permeability of said coating permits the water which has been impregnated into the fiberboard to escape from the fiberboard without blistering said coating.

2. A method for forming a resin impregnated and coated fiberboard shaped product having relatively sharp irregularities in its surface comprising:

(A) wetting and heating a resin containing fiberboard to produce an atmosphere of moisture ladened steam around said fiberboard to impregnate said fiberboard with water to soften the fibers therein, said fiberboard having a permeable resin coating directly applied to at least one side of said fiberboard, said coating having:

(1) a thickness of between about 1 and 5 mils,
(2) an elastomeric nature to permit stretching around the sharp irregularities of the surface of the resulting product and to prevent rupture of said fiberboard,
(3) a low resistance to the transmission of moisture vapor for release of the water in the fiberboard during the forming and shaping of the final product,
(4) adhesive properties when subjected to heat and pressure for producing an integral final product, and
(5) comprising a polymer of at least 50% by weight of at least one resin selected from the group consisting of: polyvinyl acetate, polystyrene, polybutadiene, butadiene acrylonitrile rubber latex, polyisobutylene rubber latex, and natural rubber latex; and (B) thereafter applying both heat of about 180° F. and a pressure of about 1,000 pounds per square inch simultaneously to said water impregnated and coated fiberboard in a heated shape mold in a press for between about 30 and 60 seconds to produce an integral shaped molded product therefrom, whereby said coating prevents said fiberboard from rupture along the sharp irregularities of the surface of the final product, and whereby the moisture permeability of said coating permits the water which has been impregnated into the fiberboard to escape from the fiberboard without blistering said coating.

References Cited by the Examiner

UNITED STATES PATENTS

| | | | |
|---|---|---|---|
| 2,296,553 | 9/42 | Heritage et al. | 154—45.9 |
| 2,310,391 | 2/43 | Brooks et al. | 154—45.9 |
| 2,310,400 | 2/43 | Crane et al. | 154—45.9 |
| 2,415,763 | 2/47 | Ryan | 154—45.9 |
| 2,698,271 | 12/54 | Clark | 154—45.9 |
| 2,735,426 | 2/56 | Claydon | 161—76 X |
| 2,802,764 | 8/57 | Slayter et al. | 154—44.5 |
| 3,006,799 | 10/61 | Adams et al. | 161—88 X |

EARL M. BERGERT, *Primary Examiner.*

MORRIS SUSSMAN, *Examiner.*